(12) United States Patent
Stamm et al.

(10) Patent No.: US 8,831,879 B2
(45) Date of Patent: Sep. 9, 2014

(54) PRESENTING INFORMATION FOR A CURRENT LOCATION OR TIME

(71) Applicant: Google Inc., Mountain View, CA (US)

(72) Inventors: Tom Carl Stamm, Louisville, CO (US); Dale Kris Hawkins, Erie, CO (US); James A. Guggemos, Windsor, CO (US); Tushar Udeshi, Broomfield, CO (US); Pablo Bellver, Mountain View, CA (US); Emil Praun, Union City, CA (US); Guang Yang, San Jose, CA (US); Andrew Kirmse, Redwood City, CA (US); Gokay Baris Gultekin, Palo Alto, CA (US); Bill Connor, Mountain View, CA (US); Keir Banks Mierle, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/952,454

(22) Filed: Jul. 26, 2013

(65) Prior Publication Data

US 2013/0345971 A1 Dec. 26, 2013

Related U.S. Application Data

(63) Continuation of application No. PCT/US2013/047182, filed on Jun. 21, 2013.

(60) Provisional application No. 61/790,539, filed on Mar. 15, 2013, provisional application No. 61/663,813, filed on Jun. 25, 2012, provisional application No. 61/663,049, filed on Jun. 22, 2012.

(51) Int. Cl.
*G01C 21/00* (2006.01)
*H04W 4/02* (2009.01)

(52) U.S. Cl.
CPC ............... *H04W 4/028* (2013.01); *G01C 21/00* (2013.01)
USPC .......................................... 701/465; 701/408

(58) Field of Classification Search
USPC .................................................. 701/465, 408
See application file for complete search history.

(56) References Cited

U.S. PATENT DOCUMENTS

| 6,177,905 | B1 | 1/2001 | Welch |
| 6,587,782 | B1 | 7/2003 | Nocek et al. |

(Continued)

OTHER PUBLICATIONS

Biggs, "GateGuru Relaunches With New Ways to Streamline Your Travel Experience", Techcrunch [online]. Apr. 26, 2013. Retrieved from the Internet: <http://techcrunch.com/2013/04/26/gateguru-re-launches-with-new-ways-to-streamline-your-travel-experience/> 3 pgs.

(Continued)

*Primary Examiner* — Mary Cheung
*Assistant Examiner* — Brian P Sweeney
(74) *Attorney, Agent, or Firm* — Shumaker & Sieffert, P.A.

(57) ABSTRACT

A computing system is described that obtains, based at least in part on information included in at least one previous communication associated with a user of a computing device, an indication of a future location and a future time and event information associated with the future location and the future time. The computing system obtains a duration of time for the user to travel from a current location of the computing device to the future location, and, based at least in part on the duration of time, obtains a departure time at which the user is predicted to need to depart from the current location in order to arrive at the future location by an arrival time based on the event. The computing system outputs, for transmission to the computing device, an indication associated with the event and including information indicative of the departure time.

26 Claims, 8 Drawing Sheets

(56) References Cited

U.S. PATENT DOCUMENTS

| | | |
|---|---|---|
| 6,850,837 B2 | 2/2005 | Paulauskas et al. |
| 7,243,130 B2 | 7/2007 | Horvitz et al. |
| 7,289,812 B1 | 10/2007 | Roberts et al. |
| 7,412,326 B2 | 8/2008 | Yoshioka et al. |
| 7,490,003 B2 | 2/2009 | Flynt |
| 7,574,661 B2 | 8/2009 | Matsuura et al. |
| 7,630,828 B2 | 12/2009 | Tajima et al. |
| 7,831,384 B2 | 11/2010 | Bill |
| 7,835,859 B2 | 11/2010 | Bill |
| 7,840,331 B2 | 11/2010 | Yoshioka et al. |
| 7,847,686 B1 | 12/2010 | Atkins et al. |
| 7,885,761 B2 | 2/2011 | Tajima et al. |
| 7,885,762 B2 | 2/2011 | Tajima et al. |
| 8,068,977 B2 | 11/2011 | Ozawa et al. |
| 8,131,467 B2 | 3/2012 | Yoshioka et al. |
| 8,166,019 B1 * | 4/2012 | Lee et al. ............ 707/708 |
| 8,170,960 B1 | 5/2012 | Bill |
| 8,458,102 B2 | 6/2013 | Bill |
| 8,498,809 B2 | 7/2013 | Bill |
| 8,498,953 B2 | 7/2013 | Lehmann et al. |
| 8,571,724 B2 | 10/2013 | Brennan et al. |
| 8,572,008 B2 | 10/2013 | Ide et al. |
| 2002/0019835 A1 | 2/2002 | Baur et al. |
| 2004/0127217 A1 | 7/2004 | Aoki et al. |
| 2006/0156209 A1 | 7/2006 | Matsuura et al. |
| 2006/0167592 A1 | 7/2006 | Kudo et al. |
| 2006/0173841 A1 | 8/2006 | Bill |
| 2006/0273930 A1 | 12/2006 | Godden |
| 2007/0010942 A1 | 1/2007 | Bill |
| 2007/0042770 A1 | 2/2007 | Yasui et al. |
| 2007/0078599 A1 | 4/2007 | Yoshioka et al. |
| 2007/0276585 A1 | 11/2007 | Hisada et al. |
| 2007/0288157 A1 | 12/2007 | Peterman |
| 2007/0288159 A1 | 12/2007 | Skelton |
| 2007/0288279 A1 | 12/2007 | Haugen et al. |
| 2008/0086455 A1 | 4/2008 | Meisels et al. |
| 2008/0155080 A1 | 6/2008 | Marlow et al. |
| 2008/0167802 A1 | 7/2008 | Yoshioka et al. |
| 2008/0167937 A1 | 7/2008 | Coughlin et al. |
| 2008/0177462 A1 | 7/2008 | Yoshioka et al. |
| 2008/0262667 A1 | 10/2008 | Otabe |
| 2009/0048774 A1 | 2/2009 | Yoshioka et al. |
| 2009/0105934 A1 | 4/2009 | Tajima et al. |
| 2009/0192702 A1 | 7/2009 | Bourne |
| 2009/0248284 A1 | 10/2009 | Yoshioka et al. |
| 2009/0312946 A1 | 12/2009 | Yoshioka et al. |
| 2010/0036601 A1 | 2/2010 | Ozawa et al. |
| 2010/0042317 A1 | 2/2010 | Tajima et al. |
| 2010/0161213 A1 | 6/2010 | Tajima et al. |
| 2010/0174998 A1 | 7/2010 | Lazarus et al. |
| 2010/0190510 A1 * | 7/2010 | Maranhas et al. ......... 455/456.1 |
| 2011/0090078 A1 * | 4/2011 | Kim et al. ................ 340/522 |
| 2011/0106436 A1 | 5/2011 | Bill |
| 2011/0126184 A1 | 5/2011 | Lisboa |
| 2011/0137831 A1 | 6/2011 | Ide et al. |
| 2011/0137834 A1 | 6/2011 | Ide et al. |
| 2011/0153629 A1 | 6/2011 | Lehmann et al. |
| 2011/0161001 A1 | 6/2011 | Fink |
| 2011/0175724 A1 | 7/2011 | Kent |
| 2011/0225532 A1 | 9/2011 | Isert et al. |
| 2011/0246404 A1 | 10/2011 | Lehmann et al. |
| 2011/0302116 A1 | 12/2011 | Ide et al. |
| 2011/0313956 A1 | 12/2011 | Abe et al. |
| 2011/0313957 A1 | 12/2011 | Ide et al. |
| 2011/0319094 A1 | 12/2011 | Usui et al. |
| 2012/0058778 A1 | 3/2012 | Waters et al. |
| 2012/0102013 A1 | 4/2012 | Martini |
| 2012/0197463 A1 | 8/2012 | Brennan et al. |
| 2012/0221231 A1 | 8/2012 | Nagata et al. |
| 2012/0221493 A1 | 8/2012 | Bill |
| 2012/0271676 A1 | 10/2012 | Aravamudan et al. |
| 2013/0036117 A1 * | 2/2013 | Fisher et al. ............ 707/736 |
| 2013/0059607 A1 | 3/2013 | Herz et al. |
| 2013/0103300 A1 | 4/2013 | Rakthanmanon et al. |
| 2013/0197890 A1 | 8/2013 | Ide et al. |
| 2013/0218445 A1 | 8/2013 | Basir |
| 2013/0262354 A1 | 10/2013 | Ide et al. |
| 2013/0321178 A1 | 12/2013 | Jameel et al. |

OTHER PUBLICATIONS

Office Action from U.S. Appl. No. 13/952,447 dated Sep. 17, 2013, 18 pp.

Final Office Action from U.S. Appl. No. 13/952,447, dated Feb. 10, 2014, 21 pp.

Response to Office Action from U.S. Appl. No. 13/952,447, dated Sep. 17, 2013, filed Dec. 17, 2013, 12 pp.

International Search Report and Written Opinion of International application No. PCT/US2013/047182, mailed Jun. 26, 2014, 11 pp.

* cited by examiner

PRESENTING INFORMATION FOR A CURRENT LOCATION OR TIME

This is a continuation-in-part of application Ser. No. PCT/US2013/47182, filed Jun. 21, 2013, which claims the benefit of U.S. Provisional Application No. 61/790,539, filed Mar. 15, 2013, U.S. Provisional Application No. 61/663,049, filed Jun. 22, 2012, and U.S. Provisional Application No. 61/663,813, filed Jun. 25, 2012, the entire contents of each of which are hereby incorporated by reference.

BACKGROUND

A mobile computing device (e.g., a mobile phone, tablet computer, etc.) may function as a personal digital assistant (PDA), a phone, a camera, an e-mail client, an Internet browser, and a global positioning system (GPS) navigation device. The mobile computing device may be used to search for information about an upcoming airline flight, nearby attractions (such as shows, events, and concerts), nearby real estate listings, local movie times, etc. A user may search within this information (e.g., using such a mobile computing device) on the Internet, within e-mail accounts, and within other information repositories stored locally or accessible by the mobile computing device. Finding a particular piece of information within all this data can be daunting and time consuming, however.

SUMMARY

In one example, the disclosure is directed to a method that includes obtaining, by a computing system and based at least in part on information included in at least one previous communication associated with a user of a computing device, an indication of a future location and a future time, and obtaining, by the computing system, information associated with an event, the event being associated with the future location and the future time. The method further includes obtaining, by the computing system, a duration of time for the user of the computing device to travel from a current location of the computing device to the future location, and obtaining, by the computing system, based at least in part on the duration of time, a departure time at which the user of the computing device is predicted to need to depart from the current location of the computing device in order to arrive at the future location by an arrival time, the arrival time being determined based at least in part on the event. The method further includes outputting, by the computing system, for transmission to the computing device, an indication associated with the event, the indication including information indicative of the departure time.

In another example, the disclosure is directed to a computing system that includes a at least one processor and at least one module operable by the at least one processor to obtain, based at least in part on information included in at least one previous communication associated with a user of a computing device, an indication of a future location and a future time, and obtain information associated with an event, the event being associated with the future location and the future time. The at least one module is further operable by the at least one processor to obtain a duration of time for the user of the computing device to travel from a current location of the computing device to the future location, and obtain, based at least in part on the duration of time, a departure time at which the user of the computing device is predicted to need to depart from the current location of the computing device in order to arrive at the future location by an arrival time, the arrival time being determined based at least in part on the event. The at least one module is further operable by the at least one processor to output, for transmission to the computing device, an indication associated with the event, the indication including information indicative of the departure time.

The details of one or more examples are set forth in the accompanying drawings and the description below. Other features, objects, and advantages of the disclosure will be apparent from the description and drawings, and from the claims.

DETAILED DESCRIPTION

Figure 1:
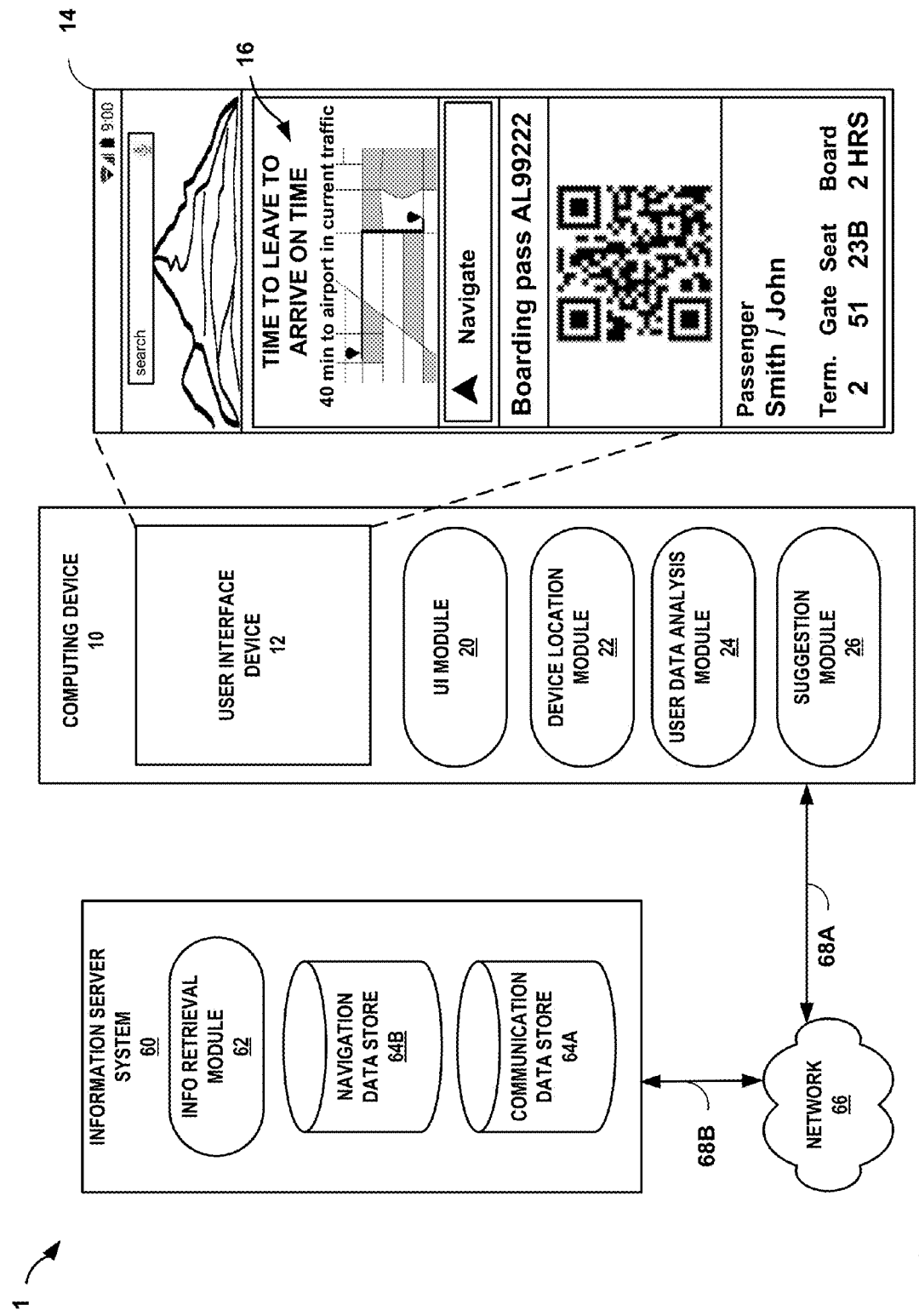
FIG. 1 is a conceptual diagram illustrating an example computing system that is configured to present information relevant to a particular time and location of the computing system, in accordance with one or more aspects of the present disclosure.

In general, techniques of this disclosure may enable a computing device to present graphical indications associated with information (also referred herein as "data") obtained from previously-received communications that include references to one or more future locations, future times, future activities, and/or future events associated with a future location and/or future time. The computing device may customize the graphical indication to a specific activity that occurs at one or more future location and/or future time.

The computing device may present the graphical indications as one or more cards of information within a graphical user interface (GUI). In some examples, the graphical indication may be a notification, an alert, or other type of graphical and/or audible indication the computing device may output for alerting a user about information that may be relevant to a current time and/or a current location, such as event and activity information.

The computing device may present information cards of varying types and categories (e.g., the information may depend on the specific activity that a user may perform at the future location and/or the future time). Some examples of the types of information cards may include flight-related information, attraction-related information (e.g., movie and event information), real estate listing information, financial/stock-related information, package-tracking information, weather information, transportation/transit-related information, and other types of information. Rather than require a user to search for a particular piece of information, the computing device can output predicted information that the user would otherwise search for and include the predicted information within, for example, one or more information cards.

The computing device may analyze previous communications only if the computing device receives permission from the user to analyze the information. For example, in situations discussed below in which the computing device may collect or may make use of personal information about the user (e.g., from previous communications) the user may be provided with an opportunity to control whether programs or features of the computing device can collect user information (e.g., information about a user's e-mail, a user's social network, social actions or activities, profession, a user's preferences, or a user's current location), or to control whether and/or how to the computing device may receive content that may be relevant to the user. In addition, certain data may be treated in one or more ways before it is stored or used by the computing device, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating computing system 1 that is configured to present information relevant to a particular time and location of the computing system 1, in accordance with one or more aspects of the present disclosure. In the example of FIG. 1, computing system 1 includes computing device 10, information server system 60, and network 66.

Network 66 of computing system 1 represents any public or private communication network, for instance, a cellular, Wi-Fi, and/or other type of network for transmitting data between computing devices. Computing device 10 and information server system 60 may send and receive data across network 66 using any suitable communication techniques. For example, computing device 10 may be operatively coupled to network 66 using network link 68A. Information server system 60 may be operatively coupled to network 66 by network link 68B. Network 66 may include network hubs, network switches, network routers, etc., that are operatively inter-coupled thereby providing for the exchange of information between computing device 10 and information server system 60. In some examples, network links 68A and 68B may be Ethernet, ATM or other network connections. Such connections may be wireless and/or wired connections.

Information server system 60 of system 1 represents any suitable remote computing system, such as one or more desktop computers, laptop computers, mainframes, servers, cloud computing systems, etc. capable of sending and receiving information across network link 68B to network 66. In some examples, information server system 60 represents a cloud computing system that provides one or more services through network 66. One or more computing devices, such as computing device 10, may access the one or more services provided by the cloud using information server system 60. For example, computing device 10 may store and/or access data in the cloud using information server system 60.

Information server system 60 includes information retrieval module 62, communication data store 64A and navigation data store 64B. Information retrieval module 62 may perform operations described using software, hardware, firmware, or a mixture of hardware, software, and firmware residing in and/or executing at Information server system 60. Information server system 60 may execute information retrieval module 62 with multiple processors or multiple devices. Information server system 60 may execute information retrieval module 62 as a virtual machine executing on underlying hardware. Information retrieval module 62 may execute as a service of an operating system or computing platform. Information retrieval module 62 may execute as one or more executable programs at an application layer of a computing platform.

Data stores 64A and 64B represent any suitable storage medium for storing data related to communications and navigation. For example, data store 64A may store communications information such as one or more previously received e-mail communications, text message communications, and the like. The communications information may be organized within data store 64A according to account names or addresses. Information server system 60 may access the data within data store 64A, for instance, by looking up an e-mail account address and obtaining one or more e-mail communications associated with the e-mail account. Data stores 64B may store navigation information such as, digital maps, navigation durations, navigation directions, and the like. Information server system 60 may provide access to the data stored at data stores 64A and 64B as a cloud based data access service to devices connected to network 66, such as computing device 10.

Information retrieval module 62 may perform functions for responding to information requests from computing device 10 related to the data stored in data stores 64A and 64B and other data stored remote to information server system 60 (e.g., data on the Internet). For instance, information retrieval module 62 may receive a request from computing device 10 via network link 68B for an estimated duration of time (e.g., a trip time for an expected travel route) to walk from one geographical location to another. Information retrieval module 62 may access data within data store 64B and/or data on the Internet or otherwise stored remotely to information server system 60 to provide information in response to the request by sending the information to computing device 10, via network link 68B and through network 66. For instance, information retrieval module 62 may obtain traffic conditions along a route of travel from a current location to a future location and based on the traffic conditions, determine the duration of time to travel the route.

In the example of FIG. 1, computing device 10 may be a mobile computing device, such as a mobile phone, a tablet computer, a personal digital assistant (PDA), a laptop computer, a portable gaming device, a portable media player, an e-book reader, a watch, a television platform, an automobile navigation system, a wearable computing platform, or any other type of computing device. As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as a graphical input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may further function as an audio input device, such as a microphone. UID 12 may function as a graphical output (e.g., display) device using any one or more display devices, such as a liquid crystal display (LCD), dot matrix display, light emitting diode (LED)

display, organic light-emitting diode (OLED) display, e-ink, or similar monochrome or color display capable of outputting visible information to the user of computing device 10. UID 12 may function as an audible output device such as a speaker for outputting instructions associated with an audio-based user interface.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14) which may be associated with functionality provided by computing device 10. For example, UID 12 may present various user interfaces of applications executing at or accessible by computing device 10 (e.g., an electronic message application, a navigation application, an Internet browser application, etc.). A user may interact with a respective user interface of an application to cause computing device 10 to perform operations relating to a function.

Computing device 10 may include user interface ("UI") module 20, device location module 22, user data analysis module 24, and suggestion module 26. Modules 20, 22, 24, and 26 may perform operations described using software, hardware, firmware, or a mixture of hardware, software, and firmware residing in and/or executing at computing device 10. Computing device 10 may execute modules 20, 22, 24, and 26 with multiple processors. Computing device 10 may execute modules 20, 22, 24, and 26 as a virtual machine executing on underlying hardware. Modules 20, 22, 24, and 26 may execute as one or more services of an operating system, a computing platform. Modules 20, 22, 24, and 26 may execute as one or more remote computing services, such as one or more services provided by a cloud and/or cluster based computing system. Modules 20, 22, 24, and 26 may execute as one or more executable programs at an application layer of a computing platform.

UI module 20 may cause UID 12 to present user interface 14. User interface 14 includes graphical indications (e.g., elements) displayed at various locations of UID 12. FIG. 1 illustrates information card 16 ("card 16") as one example graphical indication within user interface 14. As described in more detail below, card 16 includes information relevant to a particular time and location of computing device 10. UI module 20 may receive information from suggestion module 26, for instance, when computing device 10 obtains an indication that the current location of computing device 10 corresponds to a future location associated with previous communications. In response to the information from suggestion module 26, UI module 20 may cause UID 12 to output, for display, card 16 within user interface 14. In some examples, rather than cause UID 12 to output a graphical user interface, such as card 16 within user interface 14, UI module 20 may cause UID 12 to output an audio based user interface that outputs audio based on the information within card 16 and user interface 14.

Device location module 22 may determine a current location of computing device 10 and a current time. For example, computing device 10 may receive signal data from one or more radios of computing device 10 (e.g., global positioning system (GPS) radio, cellular radio, Wi-Fi radio, and the like) and based on the signal data, determine the current time and the current location of computing device 10. In some examples, device location module 22 may determine a relative location and/or determine a current location based on signal triangulation (e.g., a technique for determining a single location based on relative position data received from two or more signals). In some examples, device location module 22 may determine location data as coordinate (e.g., GPS) location data. In other examples, device location module 22 may determine a location as one or more general or relative locations, such as an address, a place, a country, a city, a type of building (e.g., a library, an airport, etc.), a business, etc.

In some examples, device location module 22 may obtain the current location of computing device 10 and/or the current time from information server system 60 via network 66. For instance, in response to a Wi-Fi network identifier received from device location module 22, information server system 60 may send GPS coordinates of computing device 10 to device location module 22. Device location module 22 may output location and time data to other modules of computing device 10 such as suggestion module 26.

User data analysis (UDA) module 24 of computing device 10 may tag or classify portions of information associated with previous communications and/or other data with a marker that indicates whether the portion of information corresponds to a location, a time, an activity, an event, etc. UDA module 24 may format the portions of information for later inclusion as graphical content within a graphical indication associated with an activity and/or event. In other words, UDA module 24 may classify or tag information by at least applying one or more location tags and one or more time tags to the information. UDA module 24 may obtain indications of future locations, future times, activities, and future events associated that are each associated with information included in previous communications (e.g., e-mail messages, text-based messages, voicemails, social media posts, Internet search queries, application interactions, webpage history, etc.) and/or other data received by computing device 10. For example, UDA module 24 may rely on data mining techniques and parse textual data contained within previously received communications to isolate words and/or phrases that indicate future locations, future times of day, activities, and future events that may be of interest to a user of computing device 10. The previous communications may be stored locally at computing device 10 and/or remotely at information server system 60. Likewise, the data mining techniques may be performed locally at computing device 10 by UDA module 24 and/or performed by information server system 60 and accessible to UDA module 24 through an application programming interface to a remote computing based service (e.g., in a cloud).

The data mining techniques performed or accessed by UDA module 24 may result in the tagging or classifying of portions of information included in the previous communications with pointers (e.g., tags) to mark those portions that indicate future locations, future times of day, activities, and future events. Other modules of computing device 10, such as suggestion module 26, can later retrieve the tagged or classified portions of information by retrieving the data pointed to by the tags. The other modules may further search for location and/or time tags associated with portions of communication information that correspond to a current location of computing device 10, a current time of day, an activity, and/or an event to determine which portions of communication information may be relevant to the current location, the current time, the activity, and/or event.

To track relationships between portions of the previously received communications, the data mining techniques performed and/or accessed by UDA module 24 may generate links between related location, time, activity and event tags.

That is, a time and/or location tag corresponding to one portion of communication data may link to an activity tag of other related portions of communication data.

UDA module 24 may format and categorize the tagged or classified portions of information within the communication data. Other modules of computing device 10, such as suggestion module 26, may utilize the formatted portions of information within different categories of graphical indications, such as one or more categories of information cards (e.g., card 16). For example, computing device 10 may present different categories of information cards that relate to different activities, events, etc. that the user may perform at a future location and/or at a future time. Examples of information card categories (e.g., events and activities) may include information cards related to electronic tickets (e-tickets), movie show times/events/attractions, transportation and/or travel information (e.g., flight information), package tracking, real estate, etc. UDA module 24 may format the tagged or classified portions of communication data into a format that can later be retrieved by suggestion module 26 and incorporated into different fields of information cards.

For example, UDA module 24 and/or information server 60 may associate one or more fields of information cards with each category of information card that relates to an activity performed at a future location and/or a future time. A flight information card may include fields that identify a date, a time, an airport, a flight number, a passenger name, etc. of a flight that a user may board at a future time. A movie show time card may include fields of information that indicate when and where a movie is playing at a particular theatre that a user may attend at a future time. A package tracking card may include fields of information that indicate a package tracking number, an estimated delivery date and time, etc. of a package that a user may receive at a future time. Other information cards may include other fields specific to that category (e.g., activity) of information card (e.g. real estate cards, event cards, attraction cards, other package tracking cards, etc.) that relate to activities associated with the user at a future location and/or a future time. UDA module 24 and/or information server 60 may data mine, tag, and format the portions of previous communications (e.g., an e-mail confirming a ticket purchase, a package tracking e-mail, browsing histories, webpage data, and third party application data of applications executing at computing device 10). Other modules of computing device 10, such as suggestion module 26, may search the tags and retrieve the formatted portions of information in one or more fields of an information card.

Computing system 1, including information server 60 and computing device 10, may analyze previous communications and other data only if computing device 10 receives permission from the user to analyze the information. For example, in situations in which computing system 1 may collect, data mine, analyze and/or otherwise make use of personal information about the user the user may be provided with an opportunity to control whether programs or features of computing system 1 can collect user information (e.g., previous communications, information about a user's e-mail, a user's social network, social actions or activities, profession, a user's preferences, or a user's current location), or to control whether and/or how to computing system 1 may receive content that may be relevant to the user. In addition, certain data may be treated in one or more ways before it is stored or used by computing system 1, so that personally identifiable information is removed. For example, a user's identity may be treated so that no personally identifiable information can be determined about the user, or a user's current location may be generalized where location information is obtained (such as to a city, ZIP code, or state level), so that a particular location of a user cannot be determined. Thus, the user may have control over how information is collected about the user and used by computing system 1.

Suggestion module 26 of computing device 10 may manage requests, from a user or an application executing at computing device 10, to display graphical indications of information that may be of interest to the user at a particular time and/or when the current location of computing device 10 corresponds to a particular place. For example, in response to an indication of an input detected at UID 12 and received by UI module 20, suggestion module 26 may cause UI module 20 to output graphical indications of information cards for display at UID 12 within user interface 14. Likewise, suggestion module 26 may automatically (e.g., without user intervention) cause UI module 20 to present graphical indications of information cards at UID 12 when the current time and/or current location of computing device 10 corresponds to a particular time and/or place. In some examples, rather than cause UID 12 to output a graphical user interface, such as user interface 14, UI module 20 may cause UID 12 to output an audio based user interface that includes audible information associated with the information within information cards.

A graphical indication of information may include the formatted and tagged or classified portions of previous communications associated with a user of computing device 10 and/or received by computing device 10. The graphical indication of information may further include other information that may not be explicitly included in the previous communications, but is related to the information contained in the previous communications. For instance, while the previous communications may include indications of future locations, times, activities, and/or events, suggestion module 26 may include other accessible data (e.g., credentials, navigation directions, predicted time of travel durations, Internet accessible content, and the like) related to the information contained in the previous communications.

Whether suggestion module 26 is invoked automatically by computing device 10 or in response to user interaction, suggestion module 26 may determine whether the current location of computing device 10 and/or the current time corresponds to any of the tags associated with the tagged or classified portions of communication data identified by UDA module 24. In other words, suggestion module 26 may search previous communications for one or more portions of information which have time and/or location tags which may be relevant to the current location of computing device 10 and/or the current time of day.

Suggestion module 26 may compare location and time data obtained from device location module 22 to the location and time values of the location and time tags associated with the formatted communication data obtained by UDA module 24. Based on the comparison to the values of the tags, suggestion module 26 may identify portions of tagged or classified communication data that may be of interest to the user at the current time and/or the current location. In other words, suggestion module 26 may obtain an indication of the future location and the future time by determining that a location value of at least one of the one or more location tags is associated with the current location and that a time value of at least one of the one or more time tags is associated with the current time.

For example, suggestion module 26 may parse the tagged or classified communication data for one or more location and/or time tags that match the current location of computing device 10 and/or the current time. In some examples, matching location and time tags may, respectively, identify locations and times that are within a threshold distance and/or a threshold amount of time from the current location of computing device 10 and/or the current time. In some examples, identifying matching tags may include determining matching categories of information, such as an activity and/or event tags, that link to the matching time and/or location tags. In other words, suggestion module 26 may determine that the location value of at least one of the one or more location tags is associated with the current location and that the time value of at least one of the one or more time tags is associated with the current time by obtaining an indication that the location value is within a threshold distance of the current location and that the time value is within a threshold time of the current time.

Suggestion module 26 may include the formatted portions of communication information associated with the matching tags within fields of information cards. Suggestion module 26 may transmit and cause UI module 20 to present one or more graphical indications of the information cards at UID 12 within user interface 14.

In some examples, suggestion module 26 may obtain other information related to the portions of communication information that have matching tags. Suggestion module 26 may include the other information within the fields of the information cards presented at UID 12. The other information may be stored locally at computing device 10 and/or provided by information server system 60. The other information may include information related to the category or activity associated with the information card that suggestion module 26 causes UI module 20 to present at UID 12, such as navigation category/activity, entertainment category/activity, real estate category/activity, commercial transportation category/activity, etc. The other information related to the category/activity may be information obtained from the Internet and related to an activity and/or event associated with the information cards.

Suggestion module 26 of computing device 10 may obtain an indication of a future location and a future time associated with information included in at least one previous communication. Suggestion module 26 computing device 10 may further obtain an activity associated with the future location and the future time. Suggestion module 26 may obtain an indication of a future time, a future location and a category/activity associated with the future time and the future location when the future location matches the current location and the future time matches the current time.

For example, computing device 10 may execute an application that receives one or more communications over time. With explicit permission from the user to access personal information such previous communications, UDA module 24 and/or information server system 60 may data mine the one or more previous communications for keywords and phrases that may indicate future times and future locations associated with future activities, events, and the like. UDA module 24 and/or information server system 60 may tag and format portions of the one or more previous communications for inclusion in fields of one or more information cards. Suggestion module 26 of computing device 10 may periodically and/or automatically monitor the current location of computing device 10 and the current time obtained from device location module 22 and parse the time and location tags associated with the previous communications to determine whether any portions of the tagged or classified communication data is relevant to the current location and/or current time and/or an event or activity associated with the current location and/or current time.

In response to determining that the current location and the current time of day match the location and/or time tags of the previous communications, suggestion module 26 may obtain an indication of the future location and the future time. Suggestion module 26 may identify one or more matching portions of tagged or classified communication data as those portions which have location tags within a threshold distance (e.g., one mile, one block, one hour drive, etc.) of the current location and/or those portions which have time tags within a threshold time (e.g., one hour, one day, etc.) of the current time. In response to identifying one or more activity tags that link to the matching time and/or location tags, suggestion module 26 may obtain the activity indicated by the linking activity tags that are associated with the future time and future location.

Suggestion module 26 generate one or more graphical indications associated with the activity and determine one or more times related to the activity for causing UI module 20 to present the one or more graphical indications at UID 12. For example, suggestion module 26 may obtain navigation information, such as a duration of time (e.g., a trip time for an expected travel route) for a user associated with computing device 10 to travel from a current location of computing device 10 to the future location. For instance, suggestion module 26 may obtain the duration of time in response to a query for a travel duration to information server system 60. The duration of time may be based at least in part on traffic conditions determined by information server system 60 along a route of travel from the current location to the future location for instance at the current time of day.

Suggestion module 26 may utilize the duration to determine when (e.g., a departure time) to cause UI module 20 to present one or more graphical indications associated with the activity at UID 12. In other words, based on the duration, suggestion module 26 may obtain the departure time at which the user is predicted to need to leave the current location to travel in order to arrive at the future location at an arrival time at least prior to the future time. The arrival time may indicate an estimated and/or recommended time for a user to arrive at the future location prior to the future time in order for the user to perform the associated activity. For example, if the activity is traveling by airplane, the future location corresponds to an airport, and the future time corresponds to time to board the airplane, the arrival time may be one hour prior to the boarding time to allow a user enough time after arriving at the airport to check bags and/or pass through security checkpoints. Suggestion module 26 may determine the departure time, based on the arrival time and the duration, in order for the user to travel from the current location of computing device 10 to arrive at the future location prior to the arrival time by at least the duration.

In response to determining that the current time corresponds to, or is within a time threshold (e.g., one hour, etc.) of the departure time, suggestion module 26 of computing device 10 may cause UI module 20 to output a graphical indication associated with the tagged or classified communication information linked to the future time, the future location and the activity at UID 12. For example, suggestion module 26 may populate the fields of an information card associated with the activity with the portions of previous communications which are linked to the matching tags. For instance, FIG. 1 illustrates an air travel information card that includes air travel information obtained from an e-mail confirmation that was sent to an e-mail account associated with the user after the user booked an airplane ticket. Suggestion module 26 may generate a graphical indication of the information card and cause UI module 20 to automatically (e.g., without user intervention) output the graphical indication for display and/or an audible indication at UID 12 at the departure time.

In some examples, suggestion module 26 may obtain additional information (e.g., information not included within the previous communications) to include within the fields of the information card associated with the activity. For example, suggestion module 26 may retrieve a credential (e.g., a boarding pass image, a bar code, a Quick Response (QR) code, etc.) associated with the activity from information server system 60 or some other source of network 66 (e.g., on the Internet). FIG. 1 illustrates a QR code that suggestion module 26 obtained from an airline's online check-in system.

In this way, computing device 10 may automatically or upon request from the user, present graphical indications (e.g., information cards) associated with information from previous communications. The graphical indications may include information that computing device 10 determines may be of interest to the user at a current location and/or a current time. A user of computing device 10 may spend less time searching through previous communications and/or on the Internet with computing device 10 to find information relevant to the current location of computing device 10 and/or the current time. With the user performing fewer searches, computing device 10 may perform fewer operations and use less power.

Figure 2:
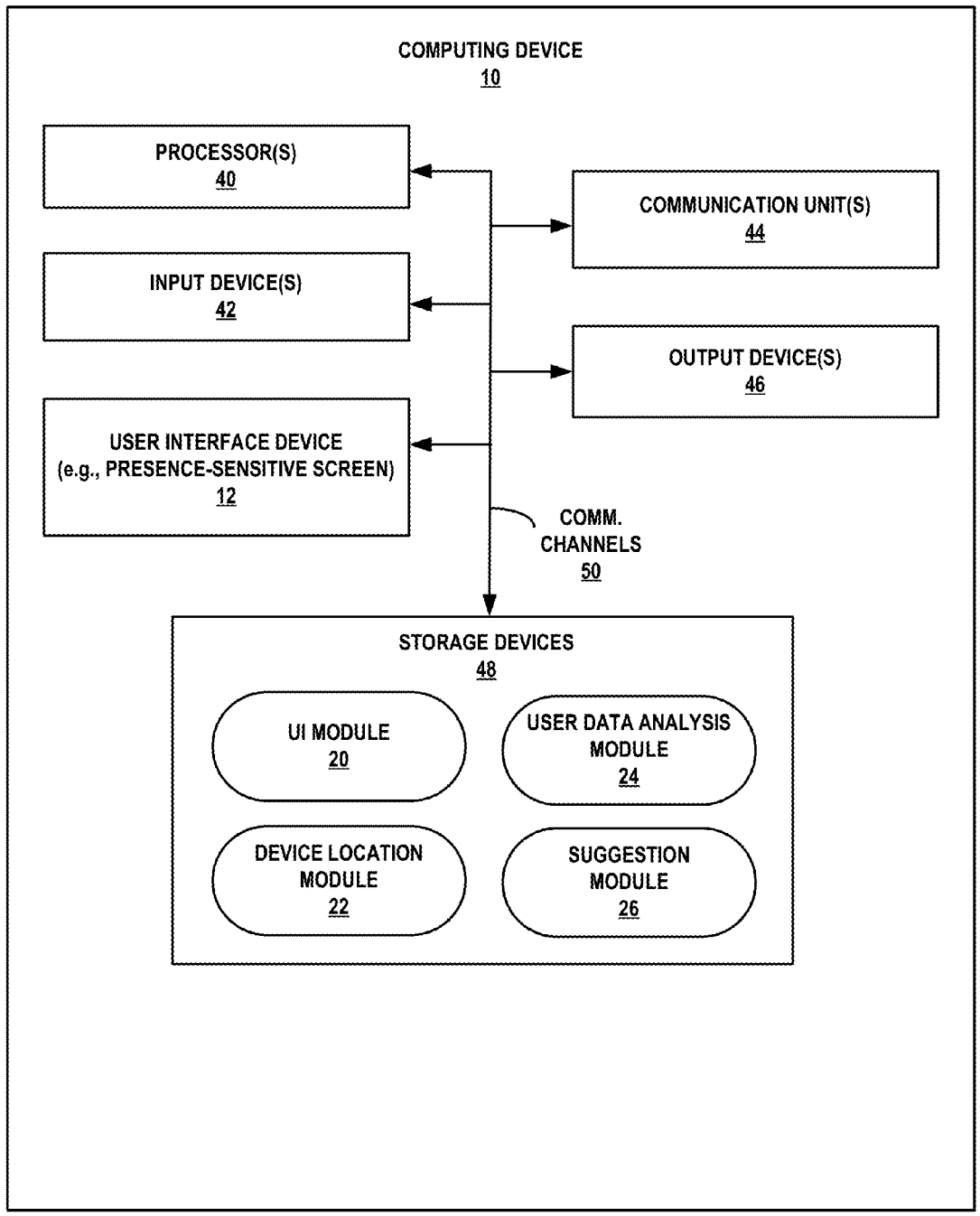
FIG. 2 is a block diagram illustrating an example computing device configured to present information relevant to a particular time and location of the computing device, in accordance with one or more aspects of the present disclosure.

FIG. 2 is a block diagram illustrating an example computing device configured to present information relevant to a particular time and location of the computing device, in accordance with one or more aspects of the present disclosure. Computing device 10 of FIG. 2 is described below within the context of system 1 of FIG. 1. FIG. 2 illustrates only one particular example of computing device 10 of system 1, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, device location module 22, user data analysis (UDA) module 24, and suggestion module 26. Communication channels 50 may interconnect each of the components 12, 13, 20, 22, 24, 26, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to send and receive data to and from information server system 60 of FIG. 1. Computing device 10 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data accessed by modules 20, 22, 24, and 26 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 20, 22, 24, and 26.

One or more processors 40 may implement functionality and/or execute instructions within computing device 10. For example, processors 40 on computing device 10 may receive and execute instructions stored by storage devices 48 that execute the functionality of UI module 20, device location module 22, UDA module 24, and suggestion module 26. These instructions executed by processors 40 may cause computing device 10 to store information, within storage devices 48 during program execution. Processors 40 may execute instructions of modules 20, 22, 24, and 26 to cause UID 12 to present user interface 14 with information card 16 at UID 12. That is, modules 20, 22, 24, and 26 may be operable by processors 40 to perform various actions or functions of computing device 10, for instance, causing UID 12 to present user interface 14 at UID 12.

Computing device 10 may be part of a mobile communications network, such as network 66 of FIG. 1, and as described in U.S. Provisional Application No. 61/663,049, filed Jun. 22, 2012, and U.S. Provisional Application No. 61/663,813, filed Jun. 25, 2012, the entire contents of each of which are hereby incorporated by reference and to which this disclosure claims priority. Computing device 10 may exchange data with a server or cloud computing system over the mobile communications network. The server or cloud computing system may perform some or all of the techniques and operations related to modules 20, 22, 24, and 26 described herein. In other words, some or all of the techniques and operations related to modules 20, 22, 24, and 26 can be implemented locally at computing device 10, for instance, a mobile phone, and some or all of the techniques and operations may by performed remotely via a server connected to the mobile communications network that exchanges data with computing device 10. In other words, while shown in FIG. 2 as being included within computing device 10, modules 20, 22, 24, and 26 may be a part of a remote computing system and may execute as one or more remote computing services, such as one or more services provided by a cloud and/or cluster based computing system.

Suggestion module 26 of computing device 10 may obtain an indication of a future location and a future location associated with information included in at least one previous communication. Suggestion module 26 of computing device 10 may further obtain an activity associated with the future location and the future time. For example, computing device 10 may execute an electronic message (e.g., an e-mail, text-based, voicemail, etc.) application that receives one or more communications over time. With explicit permission from the user to access personal information such as previous communications, UDA module 24 may data mine the information associated with one or more previous communications for keywords and phrases that may indicate future important times, future locations, activities, and events (e.g., activities or events related to the future locations and/or future times). Events may include public events, such as movies, airplane flights, other entertainment performances, etc. and personal events, or events that are not necessarily public in nature, such as birthday parties, meetings, social gatherings, etc.

In other words, UDA module 24 may search within the content of the information for one or more key words that indicate a future location, a future time, and/or event (e.g., an activity and/or event performed by a user at the future location and/or the future time). UDA module 24 may tag the portions of the information that contain the one or more keywords with one or more location tags and/or one or more time tags.

Suggestion module 26 may obtain the indication of the future location and the future time by matching at least one of the one or more location tags to the current location and at least one of the one or more time tags to the current time. For example, periodically and/or automatically, suggestion module 26 may determine that the at least one of the one or more location tags comprises a location value within a threshold distance of the current location of computing device 10 that suggestion module 26 obtained from device location module 22. Suggestion module 26 may further determine, periodically and/or automatically, that the at least one of the one or more time tags comprises a time value within a threshold time of the current time obtained from device location module 22. In other words, suggestion module 26 may periodically and/or automatically, compare the current location and the current time to the location and time tags generated by UDA module 24 to determine whether portions of previous communications information may be relevant to the current location and the current time.

Suggestion module 26 of computing device 10 may further data mine a portion of the information associated with previous communications (e.g., the pieces of information that UDA module 24 tags with one or more location and time tags) for one or more keywords associated with one or more events or activities associated with the user of computing device 10, such as traveling, attending a performance, show, movie, concert, etc., receiving a package, visiting real estate, and the like. In obtaining the indication of the activity associated with the future location and the future time, suggestion module 26 may identify at least one of the one or more keywords with the portion of the information. In other words, by parsing the location and time tagged or classified communication information for one or more keywords associated with one or more activities and events and suggestion module 26 may determine an activity and/or event associated with the future location and the future time.

Suggestion module 26 may cause UI module 20 to present one or more graphical indications associated with the events and/or activities identified within the communication information at UID 12 at certain times to assist the user in planning and/or otherwise making better use of the communication information. In other words, once suggestion module 26 obtains an indication that the future location and the future time match (e.g., are within a threshold of) the current location and the current time, suggestion module 26 may present information associated with the events and/or activities obtained from the communication information that suggestion module 26 predicts would interest the user of computing device 10.

In some examples, suggestion module 26 of computing device 10 may obtain a duration of time (e.g., a trip time for an expected travel route) for a user associated with computing device 10 to travel from a current location of computing device 10 to the future location. Suggestion module 26 of computing device 10 may obtain, based at least in part on the duration, a departure time at which the user is predicted to need to leave the current location to travel in order to arrive at the future location at an arrival time at least prior to the future location and time. For example, the information may include navigation directions, reminders and the like so the user can better plan and/or perform the associated activity and/or event at the future location and the future time. Suggestion module 26 may obtain (e.g., from information server system 60) a predicted duration of time (e.g., a trip time for an expected travel route) for the user to travel from the current location to the future location. With the predicted duration, suggestion module 26 may obtain a predicted departure time that indicates when suggestion module 26 should alert, notify, or otherwise indicate to the user that he or she should begin traveling to the future location in order to arrive at the future location in time to attend the event and/or perform the activity.

Suggestion module 26 may determine the arrival time based on the type of the activity and/or the type of the event occurring at the future location and the future time. In some examples, the arrival time (that the departure time is at least partially based on) may be prior to the future time by a determined amount of time based at least in part on the activity. In other words, suggestion module 26 may obtain a determined amount of time (e.g., a time buffer), based on the type of activity and/or the type of the event occurring at the future location and the future time, prior to the future time that may provide the user an amount of time needed to perform the activity and/or attend the event at the future time.

For instance, the determined amount of time may be one hour of time if the type of the event or the type of activity is traveling by air to provide the user enough time to check baggage and pass through security at an airport at the future location before the time to board an airplane at the future time. Likewise, the determined amount of time may be fifteen minutes of time if the type of activity or the type of the event the user is attending is a movie showing to provide the user enough time to purchase a ticket and find a seat in a theatre at the future location before the movie starts at the future time. Suggestion module 26 may determine the arrival time as a time at least prior to the future time by the determined amount of time and the departure time may be at least prior to the arrival time by the predicted duration.

In other words, suggestion module 26 may determine the arrival time based on the event, suggestion module 26 may determine the arrival time based on the activity, and/or suggestion module 26 may determine the arrival time based on the type of the event or the type of activity. For example, if the activity is playing in an amateur soccer game, suggestion module 26 may determine the arrival time to be fifteen minutes prior to the future time of the soccer match to allow the user enough time to stretch and put on his or her cleats and shin guards before the game. If the event is attending a professional baseball game, suggestion module 26 may determine the arrival time to be thirty minutes before the opening pitch to allow the user enough time to enter the stadium and take his or her seat. If the type of activity is traveling by air, or the type the of event is the departure of an aircraft, suggestion module 26 may determine the arrival time to be one hour before the departure time or one hour before the boarding time to allow the user enough time to pass through security at the airport and/or check luggage at the gate. In any event, suggestion module 26 may determine the arrival time based on the future time and suggestion module 26 may determine the arrival time based on the type of the event, based on the type of activity, based on the event, and/or based on the activity.

In any event, in response to obtaining an indication that the current time corresponds to the departure time, suggestion module 26 of computing device 10 may cause UI module 20 to output, for display and/or audio, an audible and/or graphical indication associated with the information at UID 12. For instance, in response to obtaining an indication from device location module 22 that the current time corresponds to the departure time, suggestion module 26 may generate an information card associated with the activity and/or event that is occurring at the future location at the future time.

Suggestion module 26 may obtain portions of the tagged or classified communications information that UDA module 24 formatted during the data mining of future locations, future times, activities and/or events. Suggestion module 26 may include the portions of information within fields of one or more information cards related to the activity and/or event associated with the future location and/or the future time. For instance, suggestion module 26 may include navigation directions, the predicted duration of travel time to the future location, a map showing the future location relative to the current location, etc. within a graphical indication of card 16 that UI module 20 outputs for display at UID 12.

In some examples, the graphical indication associated with the information may include customized information based on the specific activity and/or event associated with the future location and the future time. For example, the graphical indication may include a credential associated with the activity (e.g., an electronic ticket, barcode, QR code, etc.) that the user may need to show to enter the event and/or perform the activity.

In some examples, in response to obtaining an indication that the current location of the computing device corresponds to the future location, and/or in response to obtaining an indication that the current time corresponds to the future time, suggestion module 26 may cause UI module 20 to output, for display, an updated graphical indication associated with the activity. In other words, in response to obtaining an indication that the current location associated with computing device 10 is within a distance threshold (e.g., one mile, one block, five minute walk, etc.) of the future location and/or that the current time is within a time threshold (e.g., fifteen minutes, one hour, etc.) of the future time, suggestion module 26 may update the graphical indication of information card 16 to include different and/or additional information (e.g., updated navigation directions, a credential, an electronic ticket, a boarding pass, etc.) than the information included in the graphical indication that UI module 20 outputted for display at the departure time.

In some examples, suggestion module 26 of computing device 10 may cause UI module 20 to output, for display, the graphical indication of card 16 in response to an indication of an input to surface a credential associated with the activity. For example, a user may provide an input, such as a gesture at a location of UID 12. Suggestion module 26 may obtain information about the gesture from UI module 20 and determine the gesture indicates a request from the user to present card 16 at UID 12. Suggestion module 26 may cause UI module 20 to output, for display, the graphical indication of card 16, including a credential, at UID 12. For instance, FIG. 1 shows a QR code associated with an airplane ticket that the user may show to the ticketing agent prior to boarding an airplane.

Figure 3:
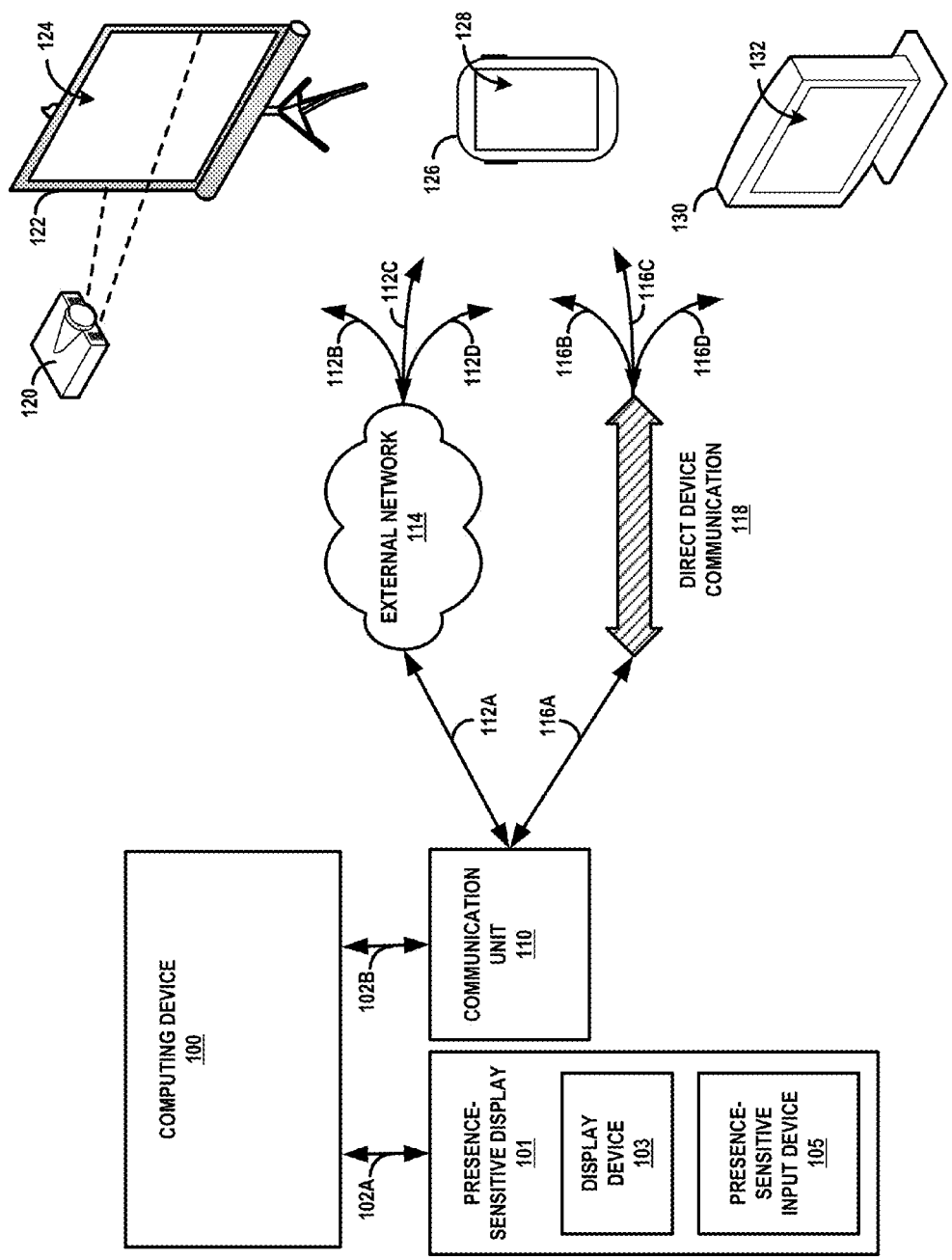
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIGS. 1 and 2 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3 G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

Computing device 100 may be operatively coupled to visual display device 130 using external network 114. Computing device 100 may obtain an indication of a future location and a future time associated with information included in at least one previous communication. For example, computing device 100 may execute an e-mail application that receives one or more e-mail messages over time. With explicit permission from the user to access personal information such as e-mail, computing device 100 may data mine the one or more e-mail messages for keywords and phrases that may indicate future important times, locations, activities, and events. Computing device 100 may apply time, location, activity, and/or event tags to portions of information within the e-mail communications for later retrieval.

Computing device 100 may determine that a current location of computing device 100 and a current time correspond to a future location and a future time associated with the tagged or classified e-mail communications. For example, computing device 100 determine that the current location is within a distance threshold of a location value of a location tag and that the current time is within a time threshold of a time value of a time tag. Computing device 100 may identify the portions of the e-mail communications associated with the matching location and time tags as being relevant to the current location and current time. Computing device 100 may data mine the portions of the e-mail communications for one or more activity and/or event keywords and obtain an activity associated with the future location and the future time indicated by the tagged or classified e-mail communications.

Computing device 100 may obtain a duration of time (e.g., a trip time for an expected travel route) for a user associated with the computing device to travel from a current location of the computing device to the future location and further obtain, based at least in part on the duration, a departure time at which the user is predicted to need to leave the current location to travel in order to arrive at the future location at an arrival time at least prior to the future time. In response to obtaining an indication that the current time corresponds to the departure time, computing device 100 may output, for display, a graphical indication associated with the tagged or classified portions of the e-mail communications. For example, computing device 100 may include portions of the previous communications that have been formatted according to the associated activity and/or event into data that represents graphical representations of information cards (e.g., card 16). Computing device 100 may send the data that represents the graphical representations to visual display device 130 over external network 114. Based on the data received over external network 114, visual display device may output for display a graphical indication associated with the information from the e-mail communications.

Figure 4:
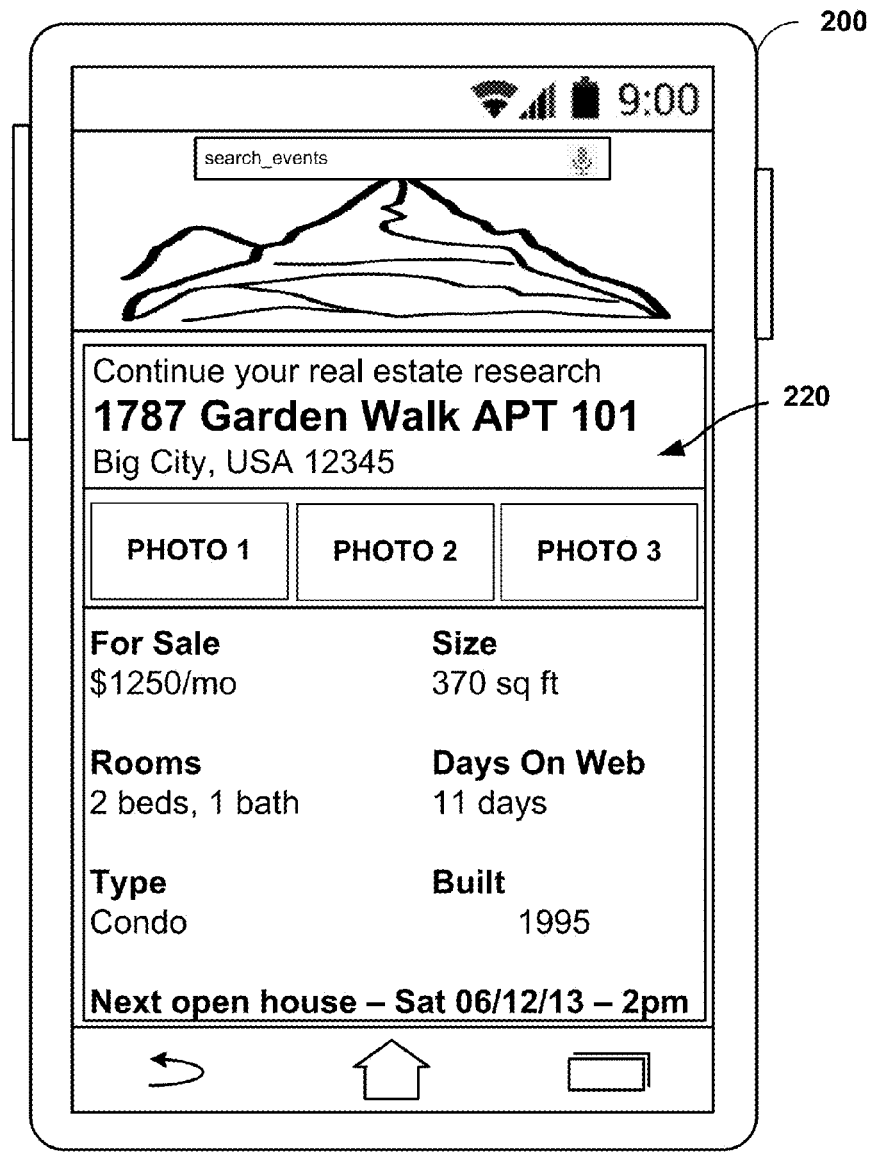
FIGS. 4-6 are conceptual diagrams illustrating example graphical user interfaces for presenting information relevant to a particular time and location of the computing device, in accordance with one or more aspects of the present disclosure.
Figure 5:
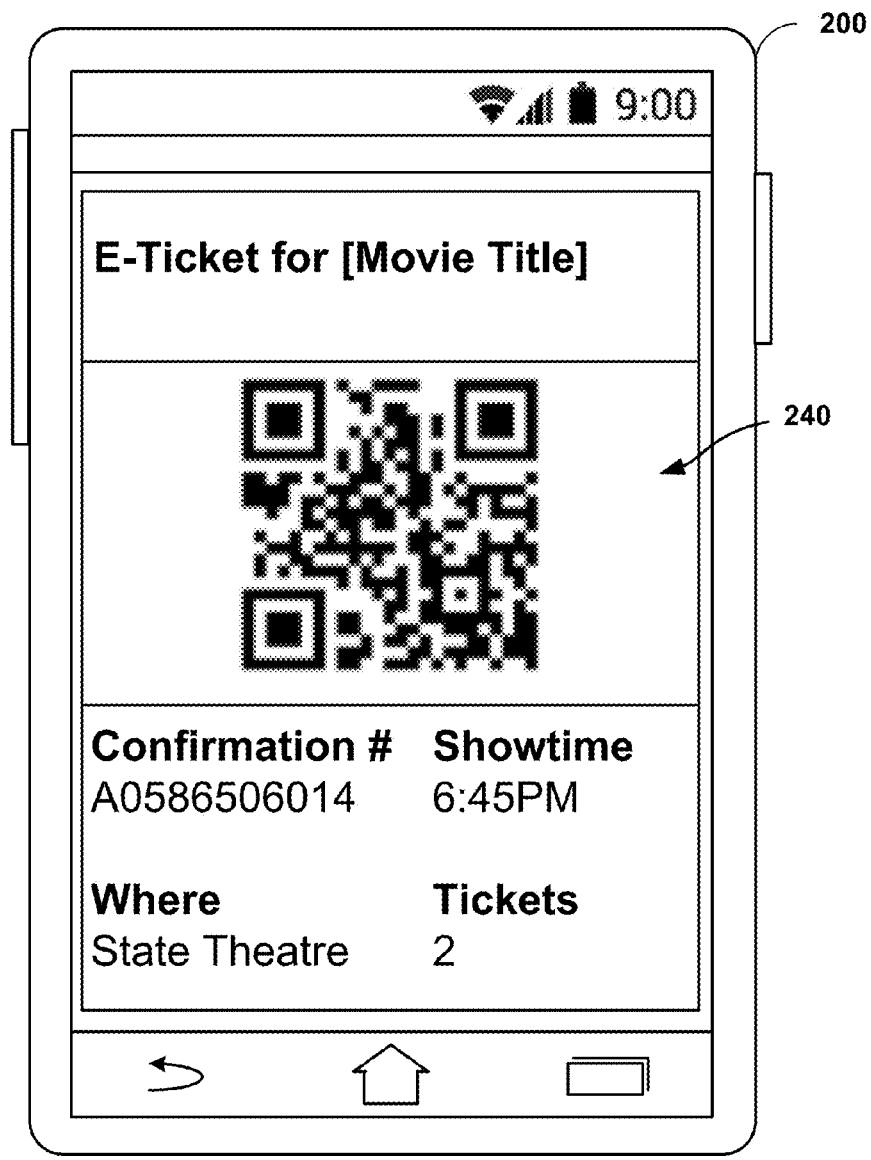
Figure 6:
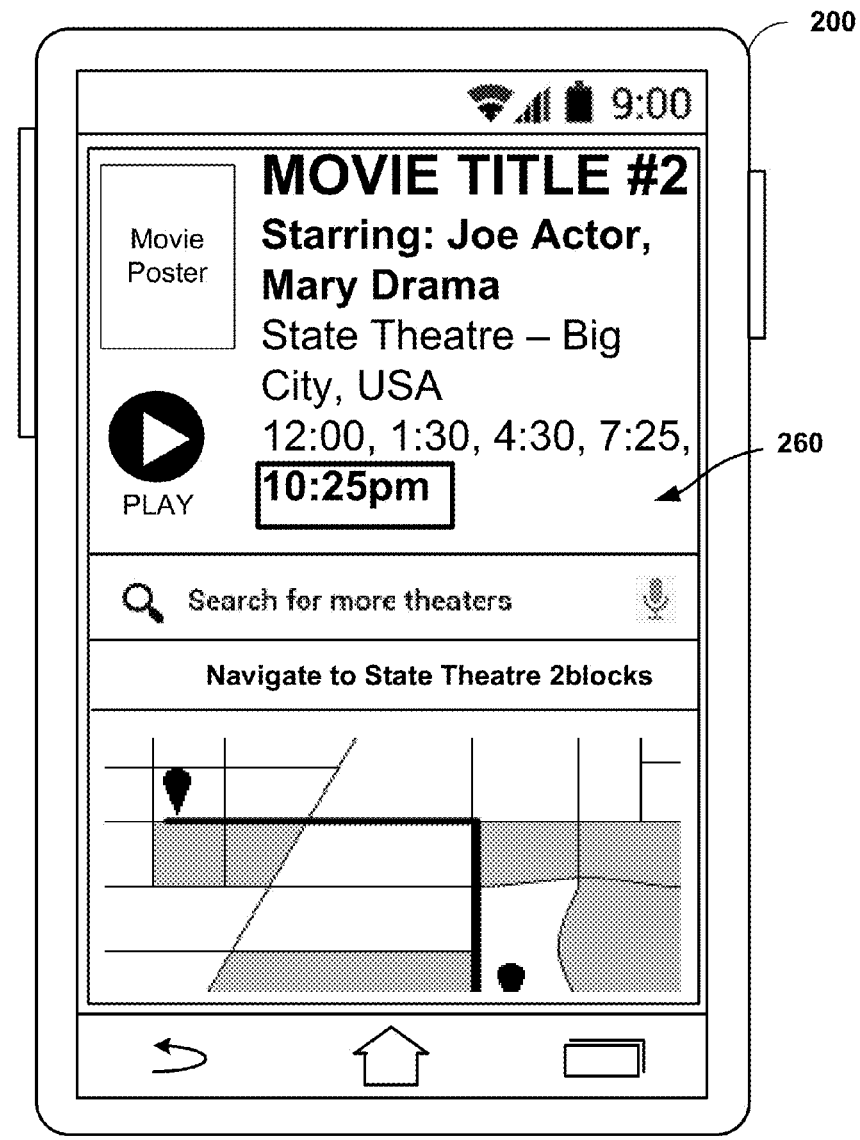

FIGS. 4 through 6 are conceptual diagrams illustrating example graphical user interfaces for presenting information relevant to a particular time and location of a computing device, in accordance with one or more aspects of the present disclosure. FIGS. 4 through 6 are described below in the context of computing device 10 from FIG. 1 and FIG. 2. For instance, FIGS. 4 through 6 show mobile phone 200 as one example of computing device 10 from FIG. 1 and FIG. 2. Mobile phone 200 may include UDA module 24, device location module 22, suggestion module 26, and UI module 20. Mobile phone may include UID 12 for presenting a user interface and information cards 220, 240, and 260 to a user.

In the example of FIG. 4, mobile phone 200 presents information card 220 (e.g., at a screen of UID 12) which includes information about an online real estate listing of an apartment for rent. Mobile phone 200 may obtain, based on previous communications related to internet searches for property listings on the internet or e-mail communications with a realtor, a future location and/or a future time associated with at least a portion of information included in the previous communications. For instance, mobile phone 200 may determine a street location or an area of a city within the previous communications and tag the previous communications with the street location.

When a user of mobile phone 200 enters the area of the city indicated by the e-mail communications, mobile phone 200 may determine the current location of mobile phone 200 corresponds to the location tag of the e-mail communication and present information card 220 that includes one or more online listings of real estate in the area (e.g., information card 220 may include portions of the information in the e-mail communication with the realtor that includes the one or more online listings). In this way, whether the user requested to view information card 220 or mobile phone 200 automatically presented information card 220, a user is alerted about information of interest to the user for a current time and a current location of mobile phone 200.

In the example of FIG. 5, mobile phone 200 presents information card 240 (e.g., at a screen of UID 12) which includes information about an e-ticket for a movie showing at a theatre. Mobile phone 200 may determine, based on a previous e-mail communication confirming the online purchase of a movie ticket, a location and a time associated with at least a portion of information included in the previous communication. For instance, mobile phone 200 may determine an address of the movie theatre and a time the movie is playing based on the previous e-mail communication and may tag the previous communication with the address and the time.

When a user of mobile phone 200 enters the movie theatre indicated in the e-mail confirmation at a time just prior to the start of the movie, mobile phone 200 may determine the current location of mobile phone 200 and the current time corresponds to the location tag of the e-mail communication and present information card 240 at UID 12 (e.g., the screen of mobile phone 200) that includes the e-ticket. In this way, whether the user requested to view information card 240 by providing an input to present a credential associated with the e-ticket or whether mobile phone 200 automatically presented information card 240, a user does not need to search for the e-ticket confirmation e-mail with mobile phone 200 while at the theatre at the time of the movie. Instead, the user is alerted about the e-ticket at the appropriate time and place indicated by the e-mail confirmation when the current location of mobile phone 200 and the current time corresponds to the location and time of the movie.

In the example of FIG. 6, mobile phone 200 presents information card 260 (e.g., at a screen of UID 12) which includes information about a movie showing at a movie theatre. Mobile phone 200 may determine, by data mining and time and location tagging or classifying of previous communications (e.g., social network interactions between a user and friends), a location associated with at least a portion of information included in the previous communications. For instance, mobile phone 200 may determine a street location of a theatre mentioned within the previous communications and tag the previous communications with the street location.

When a user of mobile phone 200 enters within a threshold distance of the theatre (e.g., one mile, fifteen minute walk, etc.) with mobile phone 200, mobile phone 200 may determine that the current location of mobile phone 200 corresponds to the location tag of the previous social media communications (e.g., the movie theatre) and present information card 260 that includes a popular movie playing at the nearby theatre in the immediate future (e.g., at 10:25 pm). In this way, whether the user requested to view information card 260 or mobile phone 200 automatically presented information card 260, a user is alerted about information of interest to the user for a current time and a current location of mobile phone 200.

Figure 7:
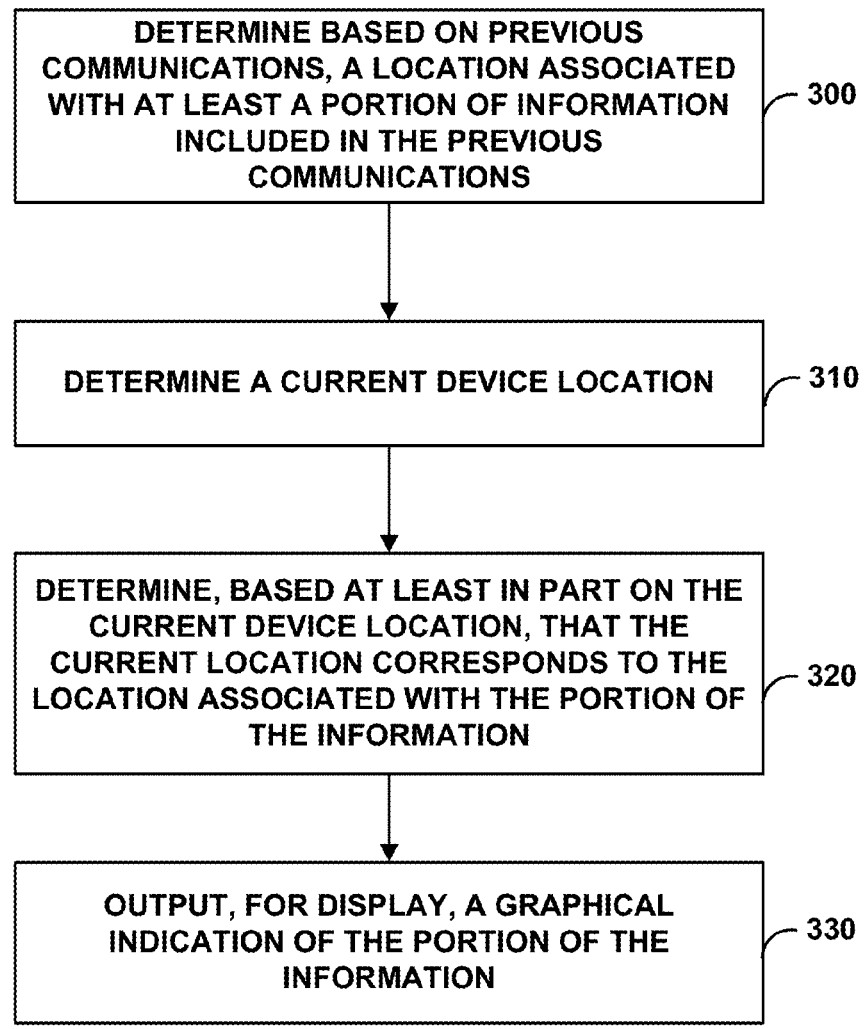
FIG. 7 is a flowchart illustrating an example operation of the computing device, in accordance with one or more aspects of the present disclosure.

FIG. 7 is a flowchart illustrating an example operation of the computing device, in accordance with one or more aspects of the present disclosure. The process of FIG. 7 may be performed by one or more processors of a computing device, such as computing device 10 and computing device 100 illustrated in FIG. 1, FIG. 2, and FIG. 3. For purposes of illustration, FIG. 7 is described below within the context of computing devices 10 of FIG. 1.

Computing device 10 may determine based on previous communications, a location associated with at least a portion of information included in the previous communications (300). For example, computing device 10 may data mine and/or otherwise parse communications for information having a time and/or location dependency, such as flight confirmations, e-tickets, etc. Computing device 10 may tag the previous communications with location and time data for later retrieval.

Computing device 10 may determine a current device location of computing device 10 (310). For example, a user interacting with computing device 10 may interact with user interface 14. The user may provide a gesture at a presence-sensitive input device of computing device 10 to command computing device 10 to present information cards within user interface 14. In response to an indication of the gesture detected at the presence-sensitive input device, computing device 10 may determine the current device location of computing device 10 (e.g., GPS coordinates) and the current time.

Computing device 10 may determine, based at least in part on the current device location, that the current location corresponds to the location associated with the portion of the information (320). For example, to determine information that the user may find relevant to the current device location and current time, computing device 10 may parse the previous communications for location and time tags corresponding to the current location and the current time. Computing device 10 may retrieve the portions of the previous communications having location and time tags that match the current location and the current time. In some examples, computing device 10 may determine the matching location and time tags based on approximate correlations between the location and time tags of portions of communication data and the current location and/or the current time. For example, computing device 10 may identify location and time tags of portions of communication data having values that are within a threshold quantity of distances and/or time to the current location and the current time. In other words, computing device 10 may search and identify location tags of data that are within a location threshold (e.g., two blocks, five miles, etc.) of the current location. Computing device 10 may search and identify matching time tags of data that are within a time threshold (e.g., one day, two hours, twenty minutes, etc.) of the current time.

Computing device 10 may output, for display, a graphical indication of the portion of the information (330). For example, computing device 10 may present one or more information cards within user interface 14 at a display device (e.g., the presence-sensitive screen).

Figure 8:
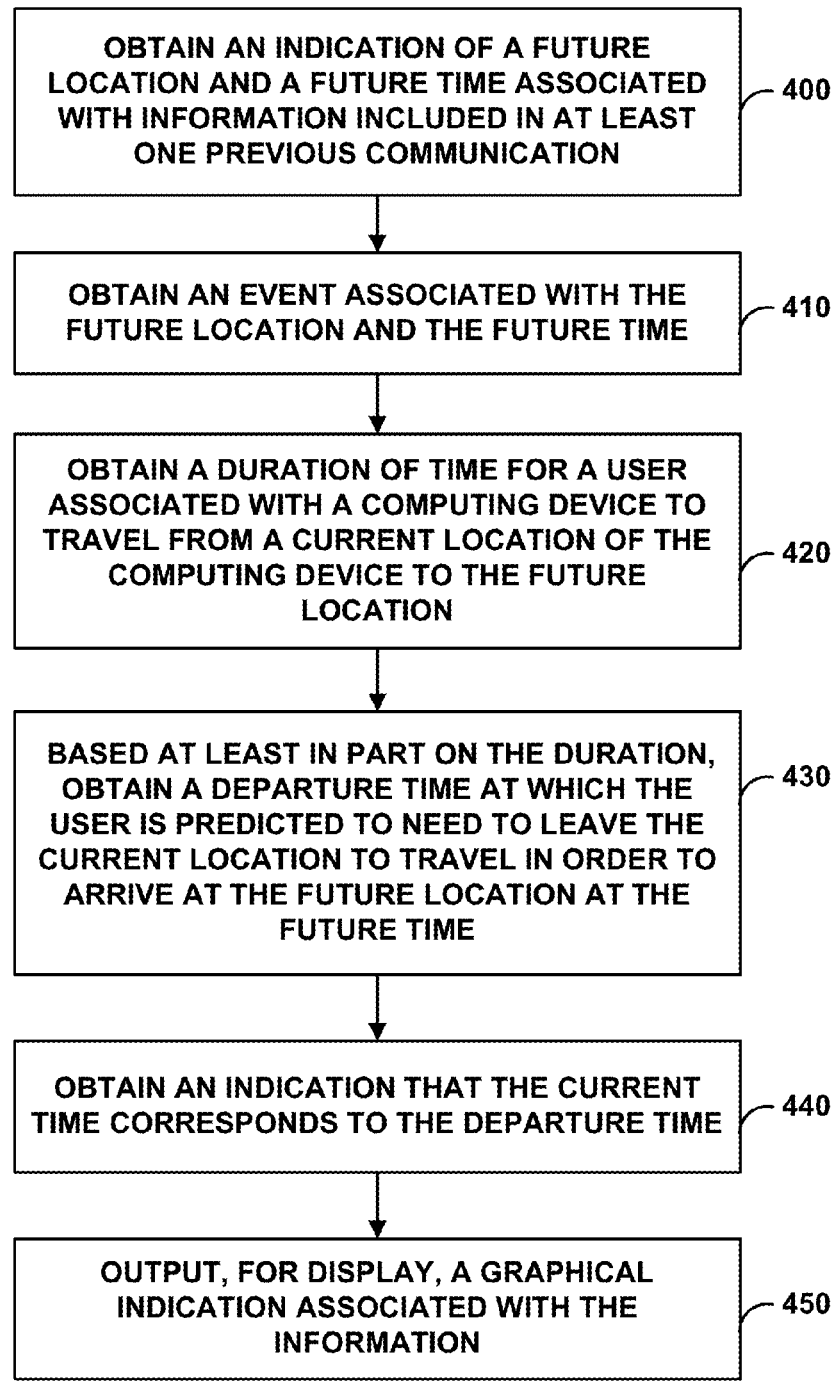
FIG. 8 is a flowchart illustrating further example operations of the computing device in accordance with one or more aspects of the present disclosure.

FIG. 8 is a flowchart illustrating further example operations of the computing device in accordance with one or more aspects of the present disclosure. The process of FIG. 8 may be performed by one or more processors of a computing device, such as computing device 10 and computing device 100 illustrated in FIG. 1, FIG. 2, and FIG. 3. For purposes of illustration, FIG. 8 is described below within the context of computing devices 10 of FIG. 1.

Suggestion module 26 of computing device 10 may obtain an indication of a future location and a future time associated with information included in at least one previous communication (400). For example, suggestion module 26 may compare the current location of computing device 10 and the current time (obtained from device location module 22) to location and time tags within previous communication information previously data mined by UDA module 24. Suggestion module 26 may determine the current location and the current time corresponds to the location of a movie theatre and the start time of a movie within an e-mail confirmation of a movie ticket purchase received from an online ticketing agent.

Suggestion module 26 of computing device 10 may obtain an event associated with the future location and the future time (410). For example, suggestion module 26 may identify an activity and/or event tag within the portions of the e-mail confirmation tagged or classified by UDA module 24 that indicates the movie showing at the theatre at the start time.

Suggestion module 26 of computing device 10 may obtain a duration of time (e.g., a trip time for an expected travel route) for a user associated with computing device 10 to travel from a current location of the computing device to the future location (420). For example, suggestion module 26 may obtain navigation directions and a predicted duration of travel time (e.g., from information server system 60 or from data stored locally at computing device 10) for a user to walk, drive, etc. from the current location obtained from device location module 22 to the future location associated with the theatre.

Based at least in part on the duration, suggestion module 26 of computing device 10 may obtain a departure time at which the user is predicted to need to leave the current location to travel in order to arrive at the future location at the future time (430). For example, suggestion module 26 may determine an arrival time prior to the start time of the movie that may provide the user enough time to walk to his or her seat in the theater and/or purchase refreshments and not miss the beginning of the movie. Based on the arrival time, and the estimated duration of time (e.g., the trip time for an expected travel route) to travel to the theater, suggestion module 26 may determine a departure time (e.g., a time that is prior to the arrival time by at least the predicted travel duration) that the user needs to leave a current location to arrive at the theatre at the arrival time. Suggestion module 26 may store the departure time as additional information within the activity and/or event tag within the portions of the e-mail confirmation tagged or classified by UDA module 24 that indicates the movie showing at the theatre at the start time.

Suggestion module 26 of computing device 10 may obtain an indication that the current time corresponds to the departure time (440). For example, suggestion module 26 may obtain the current time from device location module 22 and periodically and/or automatically compare the current time to the portions of e-mail communications tagged or classified by UDA module 24. Suggestion module 26 may determine the current time is within a time threshold (e.g., one day, one hour, one minute, etc.) of the departure time associated with the movie activity/event tag.

Suggestion module 26 of computing device 10 may cause UI module 20 to output, for display, a graphical indication associated with the information (450). For example, in response to determining the current time corresponds to the departure time of the movie, suggestion module 26 may incorporate portions of the e-mail ticket confirmation and/or other data about the movie, navigation directions, etc. into a graphical indication of an information card. Suggestion module 26 may send data that represents the graphical indication of the information card to UI module 20 to cause UI module 20 to present the information card at UID 12.

In some examples, the computing system may determine the arrival time based on a type of the event. In some examples, the computing system may output, for transmission to the computing device, an indication of a credential associated with the event. The indication of the credential may be based at least in part on a type of the event.

In some examples, responsive to obtaining an indication that the current location of the computing device is within a distance threshold of the future location, the computing system may output, for transmission to the computing device, an indication of the credential associated with the event. In some examples, responsive to obtaining an indication that a current time is within a threshold amount of time of the future time, the computing system may output, for transmission to the computing device, an indication of a credential associated with the event. In some examples, responsive to obtaining an indication that a current time is within a threshold amount of time of the arrival time, the computing system may output, for transmission to the computing device, an indication of a credential associated with the event.

In some examples, the indication associated with the event may be outputted for transmission to the computing device in response to obtaining, by the computing system, an indication that a current time is within a threshold amount of time of the departure time. In some examples, the computing system may obtain the departure time by determining, based at least in part on traffic conditions along a travel route from the current location of the computing device to the future location.

In some examples, the computing system may receive from the computing device, a request for a credential associated with the event. The indication associated with the event may be output for transmission in response to receiving the request and includes information indicative of the credential.

In some examples, the computing system may classify the information included in the at least one previous communication by at least applying one or more location tags and one or more time tags to the information. The computing system may obtain the indication of the future location and the future time by determining that a location value of at least one of the one or more location tags is associated with the current location of the computing device and that a time value of at least one of the one or more time tags is associated with a current time.

In some examples, the computing system may determine that the location value of at least one of the one or more location tags is associated with the current location of the computing device and that the time value of at least one of the one or more time tags is associated with the current time comprises by obtaining an indication that the location value is within a threshold distance of the current location of the computing device and that the time value is within a threshold time of the current time.

In some examples, the computing system may obtain the information associated with the event by identifying, at least one keyword associated with the event within a portion of the information included in the one or more previous communications, wherein the at least one keyword is based on a type of the event.

In some examples, the arrival time may be prior to the future time by an amount of time. The amount of time may be determined based at least in part on the event.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    obtaining, by a computing system and based at least in part on information included in at least one previous communication associated with a user of a computing device, an indication of a future location and a future time;
    obtaining, by the computing system, information associated with an event, the event being associated with the future location and the future time;
    determining, by the computing system, based at least in part on a type of the event, an amount of time prior to the future time at which the user of the computing device is predicted to need to arrive at the future location in order to attend the event;
    obtaining, by the computing system, a duration of time for the user of the computing device to travel from a current location of the computing device to the future location;
    obtaining, by the computing system, based at least in part on the duration of time, a departure time at which the user of the computing device is predicted to need to depart from the current location of the computing device in order to arrive at the future location by an arrival time, wherein the arrival time is prior to the future time by the amount of time; and
    prior to the departure time, outputting, by the computing system, for transmission to the computing device, an indication associated with the event, the indication including information indicative of the departure time.

2. The method of claim 1, further comprising:
    outputting, by the computing system, for transmission to the computing device, an indication of a credential associated with the event, wherein the indication of the credential is based at least in part on the type of the event.

3. The method of claim 1, further comprising:
    responsive to obtaining an indication that the current location of the computing device is within a distance threshold of the future location, outputting, by the computing system, for transmission to the computing device, an indication of the credential associated with the event.

4. The method of claim 1, further comprising:
    responsive to obtaining an indication that a current time is within a threshold duration of time of the future time, outputting, by the computing system, for transmission to the computing device, an indication of a credential associated with the event.

5. The method of claim 1, further comprising:
    responsive to obtaining an indication that a current time is within a threshold duration of time of the arrival time, outputting, by the computing system, for transmission to the computing device, an indication of a credential associated with the event.

6. The method of claim 1, wherein the indication associated with the event is outputted for transmission to the computing device in response to obtaining, by the computing system, an indication that a current time is within a threshold duration of time of the departure time.

7. The method of claim 1, wherein obtaining the departure time further comprises determining, by the computing system, based at least in part on traffic conditions along a travel route from the current location of the computing device to the future location, the departure time.

8. The method of claim 1, wherein outputting, for transmission to the computing device, the indication associated with the event further comprises responsive to receiving, from the computing device, a request for a credential associated with the event, outputting, by the computing system, for transmission to the computing device, the indication associated with the event, wherein the indication associated with the event comprises information indicative of the credential.

9. The method of claim 1, further comprising:
classifying, by the computing system, the information included in the at least one previous communication by at least applying one or more location tags and one or more time tags to the information, wherein obtaining the indication of the future location and the future time comprises determining that a location value of at least one of the one or more location tags is associated with the current location of the computing device and that a time value of at least one of the one or more time tags is associated with a current time.

10. The method of claim 9, wherein determining that the location value of at least one of the one or more location tags is associated with the current location of the computing device and that the time value of at least one of the one or more time tags is associated with the current time comprises obtaining, by the computing system, an indication that the location value is within a threshold distance of the current location of the computing device and that the time value is within a threshold time of the current time.

11. The method of claim 1, wherein obtaining the information associated with the event comprises identifying, by the computing system, at least one keyword associated with the event within a portion of the information included in the one or more previous communications, wherein the at least one keyword is based on a type of the event.

12. The method of claim 1, wherein the event comprises an airplane flight that is scheduled to depart from an airport location, wherein the future location comprises the airport location, wherein the future time comprises a boarding time of the airplane flight, and wherein the arrival time is at least one half hour prior to the boarding time of the airplane flight.

13. The method of claim 1, wherein the event comprises a movie showing that is scheduled to play at a movie theatre, wherein the future location comprises the movie theatre location, wherein the future time comprises a start time of the movie showing, and wherein the arrival time is at least one minute prior to the start time of the movie showing.

14. A computing system comprising:
at least one processor; and
at least one module operable by the at least one processor to:
obtain, based at least in part on information included in at least one previous communication associated with a user of a computing device, an indication of a future location and a future time;
obtain information associated with an event, the event being associated with the future location and the future time;
determine, based at least in part on a type of the event, an amount of time prior to the future time at which the user of the computing device is predicted to need to arrive at the future location in order to attend the event;
obtain a duration of time for the user of the computing device to travel from a current location of the computing device to the future location;
obtain, based at least in part on the duration of time, a departure time at which the user of the computing device is predicted to need to depart from the current location of the computing device in order to arrive at the future location by an arrival time, wherein the arrival time is prior to the future time by the amount of time; and
output, for transmission to the computing device, an indication associated with the event, the indication including information indicative of the departure time.

15. The computing system of claim 14, wherein the at least one module is further operable by the at least one processor to output, for transmission to the computing device, an indication of a credential associated with the event, wherein the indication of the credential is based at least in part on the type of the event.

16. The computing system of claim 14, wherein responsive to obtaining an indication that the current location of the computing device is within a distance threshold of the future location, the at least one module is further operable by the at least one processor to output, for transmission to the computing device, an indication of the credential associated with the event.

17. The computing system of claim 14, wherein responsive to obtaining an indication that a current time is within a threshold duration of time of the future time, the at least one module is further operable by the at least one processor to output, for transmission to the computing device, an indication of a credential associated with the event.

18. The computing system of claim 14, wherein responsive to obtaining an indication that a current time is within a threshold duration of time of the arrival time, the at least one module is further operable by the at least one processor to output, for transmission to the computing device, an indication of a credential associated with the event.

19. The computing system of claim 14, wherein the at least one module is further operable by the at least one processor to output the indication associated with the event for transmission in response to an indication obtained by the at least one module that a current time is within a threshold duration of time of the departure time.

20. The computing system of claim 14, wherein the at least one module is further operable by the at least one processor to obtain the departure time by determining, based at least in part on traffic conditions along a travel route from the current location of the computing device to the future location, the departure time.

21. The computing system of claim 14, wherein the at least one module is further operable by the at least one processor to output, for transmission to the computing device, the indication associated with the event by at least:
responsive to receiving, from the computing device, a request for a credential associated with the event, outputting, for transmission to the computing device, the indication associated with the event, wherein the indication associated with the event comprises information indicative of the credential.

22. The computing system of claim 14, wherein the at least one module is further operable by the at least one processor to classify the information included in the at least one previous communication by at least applying one or more location tags and one or more time tags to the information, and wherein the at least one module is further operable by the at least one processor to obtain the indication of the future location and the future time by determining that a location value of at least one of the one or more location tags is associated with the current location of the computing device and that a time value of at least one of the one or more time tags is associated with a current time.

23. The computing system of claim 22, wherein the at least one module is further operable by the at least one processor to determine that the location value of at least one of the one or more location tags is associated with the current location of the computing device and that the time value of at least one of the one or more time tags is associated with the current time by obtaining an indication that the location value is within a threshold distance of the current location of the computing device and that the time value is within a threshold time of the current time.

24. The computing system of claim 14, wherein the at least one module is further operable by the at least one processor to obtain the information associated with the event by identifying at least one keyword associated with the event within a portion of the information included in the one or more previous communications, wherein the at least one keyword is based on a type of the event.

25. The system of claim 14, wherein the event comprises an airplane flight that is scheduled to depart from an airport location, wherein the future location comprises the airport location, wherein the future time comprises a boarding time of the airplane flight, and wherein the arrival time is at least one half hour prior to the boarding time of the airplane flight.

26. The system of claim 14, wherein the event comprises a movie showing that is scheduled to play at a movie theatre, wherein the future location comprises the movie theatre location, wherein the future time comprises a start time of the movie showing, and wherein the arrival time is at least one minute prior to the start time of the movie showing.

* * * * *